United States Patent
Eustis

(10) Patent No.: US 11,596,222 B2
(45) Date of Patent: Mar. 7, 2023

(54) LEG-PLATE JOINERY ASSEMBLY

(71) Applicant: Eustis Chair, LLC, Charlestown, MA (US)

(72) Inventor: Frederic George Eustis, Cambridge, MA (US)

(73) Assignee: EUSTIS CHAIR, LLC, Charlestown, MA (US)

( * ) Notice: Subject to any disclaimer, the term of this patent is extended or adjusted under 35 U.S.C. 154(b) by 16 days.

(21) Appl. No.: 17/448,449

(22) Filed: Sep. 22, 2021

(65) Prior Publication Data

US 2022/0087412 A1 Mar. 24, 2022

Related U.S. Application Data

(60) Provisional application No. 63/082,726, filed on Sep. 24, 2020.

(51) Int. Cl.
*A47B 13/02* (2006.01)

(52) U.S. Cl.
CPC ...... *A47B 13/021* (2013.01); *A47B 2200/002* (2013.01); *A47B 2230/00* (2013.01)

(58) Field of Classification Search
CPC . A47B 13/021; A47B 13/04; A47B 2200/002; A47B 2230/00; A47B 2230/11
See application file for complete search history.

(56) References Cited

U.S. PATENT DOCUMENTS

| | | | |
|---|---|---|---|
| RE23,665 E | * | 6/1953 | Pettibone ............... A47C 7/004 248/345.1 |
| 2,809,876 A | | 10/1957 | Huff |
| D184,029 S | | 12/1958 | Schaefer |
| 2,882,110 A | | 4/1959 | Mutchnik |
| 2,905,422 A | | 9/1959 | Sacharow |
| 3,179,365 A | | 4/1965 | Holtz |
| 3,263,630 A | | 8/1966 | Carlson |
| 3,267,888 A | | 8/1966 | Carlson |
| 4,493,582 A | * | 1/1985 | Drabsch ................. F16B 12/04 403/267 |
| 4,745,867 A | * | 5/1988 | Niemiec ............. A47B 13/021 248/188 |
| 5,050,829 A | | 9/1991 | Sykes |
| 5,528,996 A | * | 6/1996 | Edwards ............. A47B 87/002 248/188 |
| 5,664,899 A | | 9/1997 | Eustis |

(Continued)

*Primary Examiner* — Anita M King
(74) *Attorney, Agent, or Firm* — McLane Middleton, Professional Association

(57) ABSTRACT

A leg-plate joinery assembly includes a metal plate portion having a first set of one or more apertures and a second set of one or more apertures, a leg portion having one or more bore holes, wherein each bore hole includes a narrow portion and a wide portion, a first set of one or more mechanical fasteners configured to pass through corresponding apertures of the first set of one or more apertures such that each mechanical fastener is received in a corresponding, aligned one of the one or more bore holes, and a second set of one or more mechanical fasteners, wherein each mechanical fastener in the second set of one or more mechanical fasteners configured to pass through a corresponding aperture of the second set of one or more apertures. An epoxy composition is configured to be received in each of the one or more bore holes.

12 Claims, 4 Drawing Sheets

(56) References Cited

U.S. PATENT DOCUMENTS

| | | | | |
|---|---|---|---|---|
| 5,794,545 | A * | 8/1998 | McDaniel | A47B 13/021 |
| | | | | 248/188 |
| 9,726,209 | B2 | 8/2017 | Meller Hansen | |
| D832,011 | S | 10/2018 | Hughes | |
| 11,401,962 | B2 * | 8/2022 | Hutson | F16B 12/10 |
| 2022/0125194 | A1 * | 4/2022 | Dame | A47B 13/003 |

* cited by examiner

LEG-PLATE JOINERY ASSEMBLY

CROSS-REFERENCE TO RELATED APPLICATION

This application claims the priority benefit of U.S. provisional application No. 63/082,726 filed Sep. 24, 2020 (ADN 116933). The aforementioned application is incorporated herein by reference in its entirety.

BACKGROUND

The present invention relates to a supporting assembly and, more particularly, to a joinery assembly, for example for tables and chairs. The joint structure has a metal plate affixed in one direction to a furniture leg and immobilized by high-strength epoxy composition, and in the opposite direction to a furniture surface, such as the bottom surface of a tabletop or a bottom surface of a chair seat.

Various types of furniture are known. Existing table legs are often attached to aprons of a tabletop for structural strength and support. In order to provide adequate support to the table legs, an apron must typically be about 3 inches wide or more. Attempts to build a table with aprons that have sufficient, lasting structural support and provides adequate leg clearance for certain individuals and compliance with federal laws are encountered with difficulty, as the apron width required to provide support reduces the amount of leg clearance space. Building tables without aprons helps to avoid the leg clearance issue but is encountered with different difficulties in ensuring the legs are sufficiently well-attached to the table to provide lasting structural support and withstand use. As furniture is used, movement causes the furniture joints to loosen, requiring tightening, adjusting, or other maintenance over time. Prior attempts to address this problem, for example, by permanently fixing the furniture legs to the furniture body are undesirable due to the difficulty of transporting or storing such furniture.

The present disclosure contemplates a leg-plate joint capable of secure attachment that maintains structural integrity through use over time while also allowing the legs to be removably attachable for ease of transportation and storage.

The present disclosure provides an improved leg joinery assembly that overcomes the above-referenced problems and others.

It will be recognized that the present development is not limited to use with wood furniture, including tables, chairs, benches, stools, sofas, and other furniture having legs, but may be used with any structure requiring a stable attachment, including for example vertical or upright support posts for rails or handrails, e.g., porch or deck railings or handrails wherein the vertical supports for the rails may likewise be secured to a base surface such as a stair tread or the porch or deck surface, and other applications.

SUMMARY

In one aspect, a leg-plate joinery assembly includes a metal plate portion having a first set of one or more apertures and a second set of one or more apertures, a leg portion having one or more bore holes aligned with the first set of one or more apertures, wherein each bore hole includes a narrow portion and a wide portion, a first set of one or more mechanical fasteners, wherein each mechanical fastener is configured to pass through a corresponding aperture of the first set of one or more apertures in the metal plate, such that each mechanical fastener is received in a corresponding, aligned one of the one or more bore holes in the leg portion, and a second set of one or more mechanical fasteners, wherein each mechanical fastener in the second set of one or more mechanical fasteners configured to pass through a corresponding aperture of the second set of one or more apertures. An epoxy composition is configured to be received in each of the one or more bore holes.

In a more limited aspect, each wide portion has a width configured to allow the epoxy composition to completely surround at least a portion of the corresponding mechanical fastener of the first set of one or more mechanical fasteners.

In a more limited aspect, each mechanical fastener of the first set of one or more mechanical fasteners includes a distal end, wherein the distal end is mechanically secured within the corresponding narrow portion of the one or more bore holes.

In a more limited aspect, the metal plate portion is formed of mild steel.

In a more limited aspect, the metal plate portion is removably attachable to a substantially planar surface having one or more cavities, wherein each of the one or more cavities is aligned with a corresponding aperture of the second set of one or more apertures.

In a more limited aspect, each cavity is configured to receive an internally threaded insert, wherein each threaded insert is configured to receive a corresponding mechanical fastener of the second set of one or more mechanical fasteners.

In a more limited aspect, the narrow portion is a bore portion and the wide portion is a counterbore portion.

In another aspect, an article of furniture includes a support member and a leg-plate joinery assembly. The leg plate joinery assembly includes a metal plate portion having a first set of one or more apertures and a second set of one or more apertures, a leg portion having one or more bore holes aligned with the first set of one or more apertures, each bore hole including a narrow portion and a wide portion, a first set of one or more mechanical fasteners, each mechanical fastener in the first set of one or more mechanical fasteners configured to pass through a corresponding aperture of the first set of one or more apertures such that it is received in a corresponding, aligned one of the one or more bore holes, and a second set of one or more mechanical fasteners, each mechanical fastener in the second set of one or more mechanical fasteners configured to pass through a corresponding aperture of the second set of one or more apertures. An epoxy composition is configured to be received in each of the one or more bore holes.

In a more limited aspect, the support member is selected from the group consisting of a table top and a chair seat.

In another aspect, a railing support assembly includes a metal plate portion having a first set of one or more apertures and a second set of one or more apertures, a support post comprising an elongated member having one or more bore holes aligned with the first set of one or more apertures, each bore hole including a narrow portion and a wide portion, a first set of one or more mechanical fasteners, each mechanical fastener in the first set of one or more mechanical fasteners configured to pass through a corresponding aperture of the first set of one or more apertures such that each mechanical fastener is received in a corresponding, aligned one of the one or more bore holes, and a second set of one or more mechanical fasteners, each mechanical fastener in the second set of one or more mechanical fasteners configured to pass through a corresponding aperture of the second set of one or more apertures. An epoxy composition is configured to be received in each of the one or more bore holes.

In a more limited aspect, the metal plate portion is removably attachable to a substantially planar surface having one or more cavities, wherein each of the one or more cavities is aligned with a corresponding aperture of the second set of one or more apertures.

In a more limited aspect, each cavity is configured to receive an internally threaded insert, wherein each internally threaded insert is configured to receive a corresponding mechanical fastener of the second set of one or more mechanical fasteners.

One advantage of the present development is that it provides a removable leg joint that maintains structural integrity and reduces or eliminates the need for tightening or adjusting of mechanical fasteners over time.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Detailed embodiments of the present development are disclosed herein; however, it is to be understood that the disclosed embodiments are merely exemplary of the invention, which may be embodied in various forms. Therefore, specific structural and functional details disclosed herein are not to be interpreted as limiting but merely as a basis for the claims and as a representative basis for teaching one skilled in the art to variously employ the present inventive concept in virtually any appropriately detailed structure. Further, the terms and phrases used herein are not intended to be limiting but rather to provide an understandable description of the present development.

The terms "a" or "an," as used herein, are defined as one or more than one. The term "another," as used herein, is defined as at least a second or more. The terms "including" and/or "having" as used herein, are defined as comprising (i.e., open transition). The term "coupled" or "operatively coupled," as used herein, is defined as indirectly or directly connected.

Figure 1:
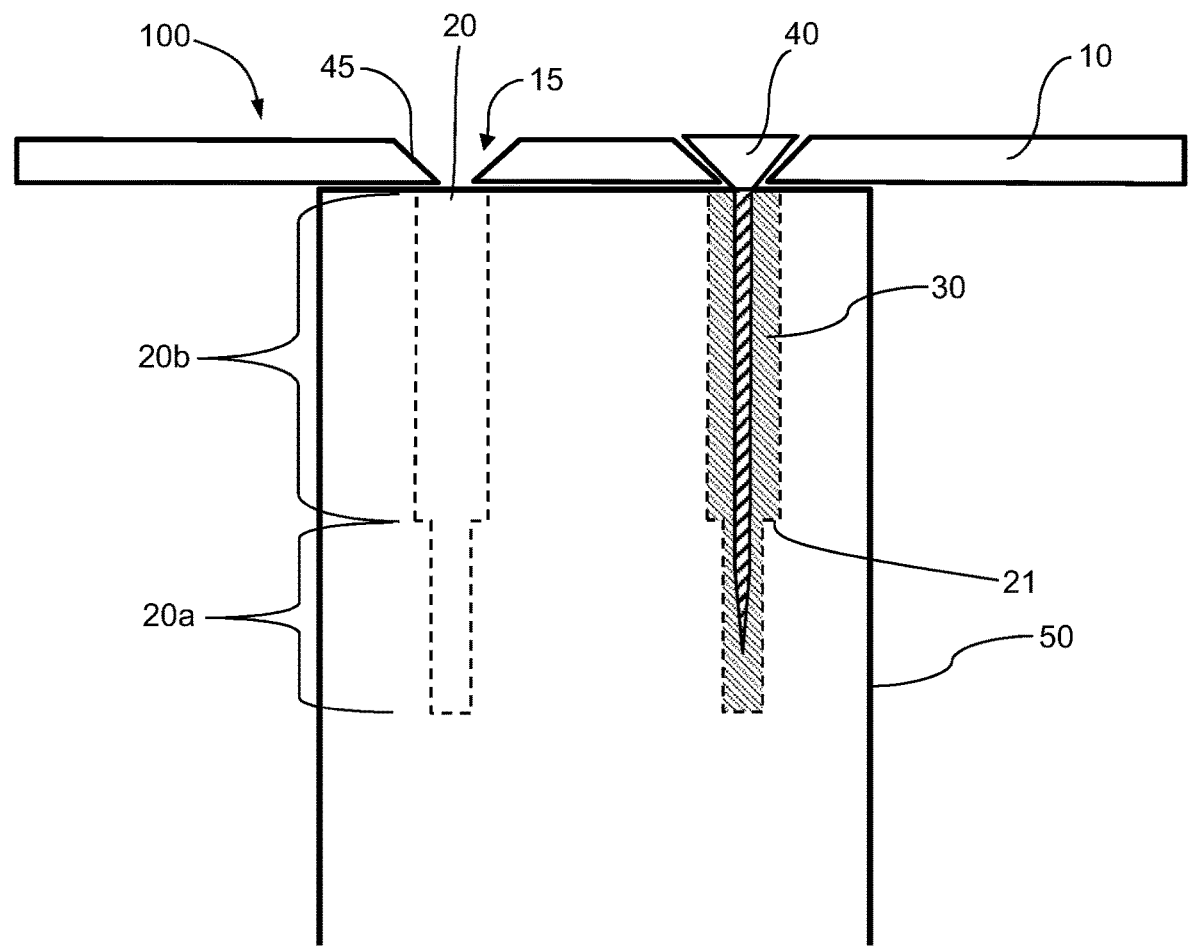
FIG. 1 is a side cross-sectional view according to an exemplary embodiment showing a metal plate and a leg element with one flat-head screw inserted.
Figure 2:
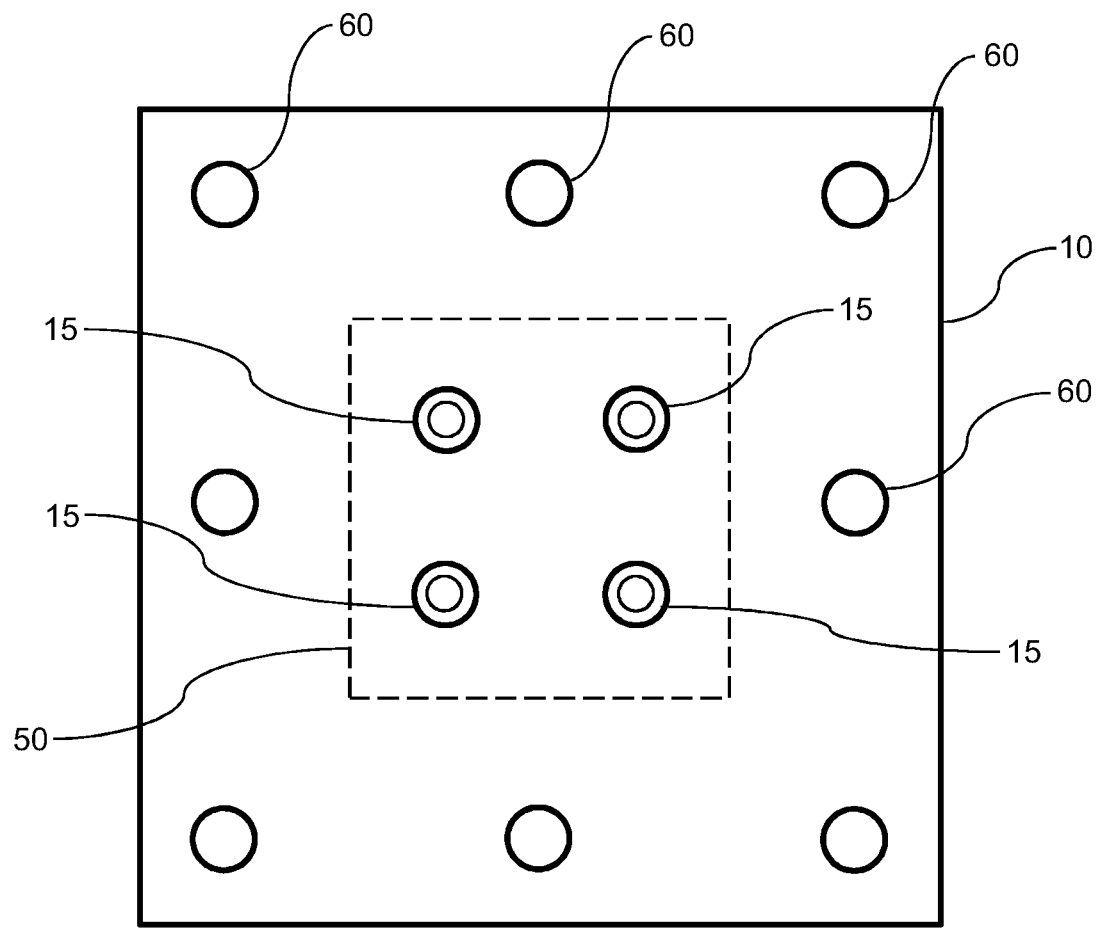
FIG. 2 is a top view of the metal plate of FIG. 1.

Referring now to the drawings, FIGS. 1-2 illustrate a leg-plate joinery subassembly, generally designated 100, configured for attachment to a surface 1055, such as of a table 1000 or other article of furniture. When attached, the furniture joint system includes a metal plate 10 interposed between a top surface of a leg 50 and a furniture surface 1055, wherein the plate 10 is fixed to the top surface of the leg via mechanical fasteners and epoxy and attachable to the furniture body via mechanical fasteners.

FIG. 1 is a side cross-sectional view of a leg-plate subassembly. One or more mechanical fasteners 40 pass through one or more apertures 15 in the metal plate 10 and into one or more corresponding cavities or bore holes 20 in the leg 50. In certain embodiments, the plate is formed of a metal, such as flat rolled mild steel. Each aperture 15 is configured to receive a mechanical fastener 40, such as a flat-headed screw. In certain embodiments, the head of the screw 40 is received in a conical recess or countersink 45 of the plate 10 when the screw 40 is received into the leg 50. The bore holes 20 have at least two different diameter portions, namely, a narrower width portion 20a relative to a wider width portion 20b. In certain embodiments, the leg bore holes 20 are formed with a stepped construction (e.g., such as a bore portion 20a and a counterbore portion 20b). Although the intersection of the bore portion 20a and counterbore portion 20b is shown as having a generally flat shoulder portion 21, it will be recognized that the shoulder portion may also be tapered, rounded, etc. The bore hole 20 is configured to receive an epoxy composition 30, such as a high-strength epoxy resin. The wider bore portion 20b is configured to allow the epoxy 30 to completely surround the threads of the screw 40 when the screw 40 is inserted into the bore hole 20, and form a bond to the walls of the bore hole 20. The narrower bore portion 20a is configured to receive the distal end of the screw 40. The diameter of the bore portion 20a is slightly less than the diameter of the threads of the screw 40 to allow the distal end of the screw 40 to be torqued into the walls of the narrower bore portion 20a, thereby mechanically securing the screw 40 within the borehole 20 and drawing the plate 10 towards the top of the leg 50 and retaining the plate 10 to the leg 50, e.g., in clamping fashion. This configuration also retains the plate 10 in a desired position while the epoxy composition 30 cures. In certain embodiments, when the screw 40 is fully received in the bore hole 20, sufficient epoxy 30 is employed in the bore hole 20 to occupy substantially the entire space in the bore hole 20 between the screw 40 and the walls of the bore hole 20. In certain embodiments, each bore hole 20 is filled about three-quarters full of epoxy composition 30 prior to insertion of the corresponding mechanical fastener 40. The epoxy resin may any commercially available high-strength epoxy resin, e.g., a two-part resin/hardener system, suitable for forming a bond with the furniture material.

In the illustrated embodiment, four leg-retention screws 40 are employed through four corresponding apertures 15 and bore holes 20; however, it will be recognized that any number of mechanical fasteners 40 and corresponding bore holes 20, including 1, 2, 3, 4, 5, 6, or more, may be employed for attaching the plate to the leg.

In certain embodiments, the counterbore portion 20b comprises a greater proportion of the cavity than the bore portion 20a. In certain embodiments, the cavity is three inches deep, having a one inch bore portion 20a and a two inch counterbore portion 20b, wherein a three inch flat-head screw is received in the bore hole 20.

FIG. 2 is a top view of a metal plate 10, illustrating the surface of the plate opposite the leg 50, illustrating the surface of the plate opposite the leg 50 (shown in broken lines). The plate 10 includes a second set of one or more apertures 60 extending through the metal plate 10, which are configured to receive a second set of one or more mechanical fasteners 80. The second set of mechanical fasteners are inserted through the plate 10 in the substantially opposite direction of screws 40. In certain embodiments, the metal plate includes eight apertures 60 for receiving eight mechanical fasteners; however, it will be recognized that any number of mechanical fasteners may be employed for attaching the leg-plate subassembly 100 to the planar surface. The plate 10 is configured to be removably attachable to a surface, such as an underside of a tabletop or chair seat. In certain embodiments, the epoxy 30 of the leg-plate subassembly 100 is permitted to fully cure prior to attachment to another surface, such as the bottom surface of a table top.

Figure 3:
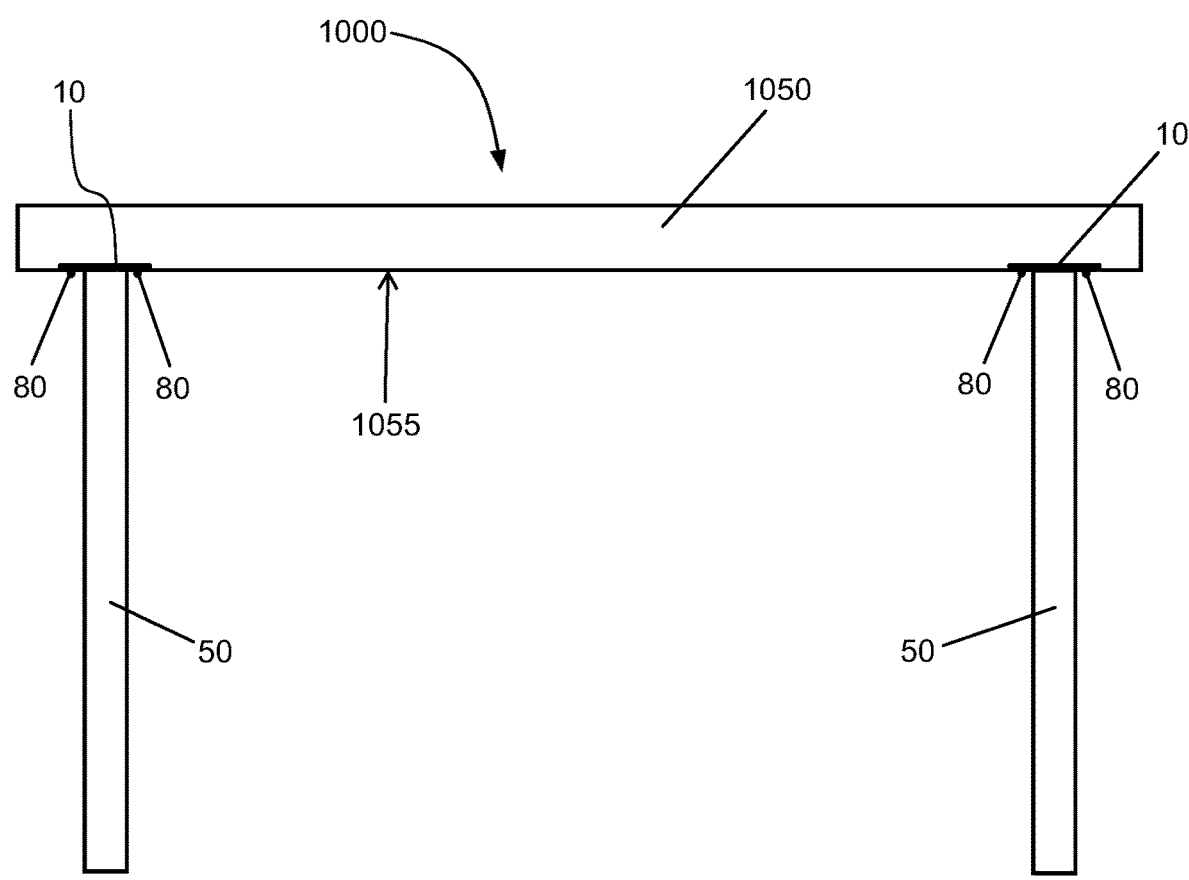
FIG. 3 is a side view of an exemplary table employing the leg joint in accordance with this disclosure.
Figure 4:
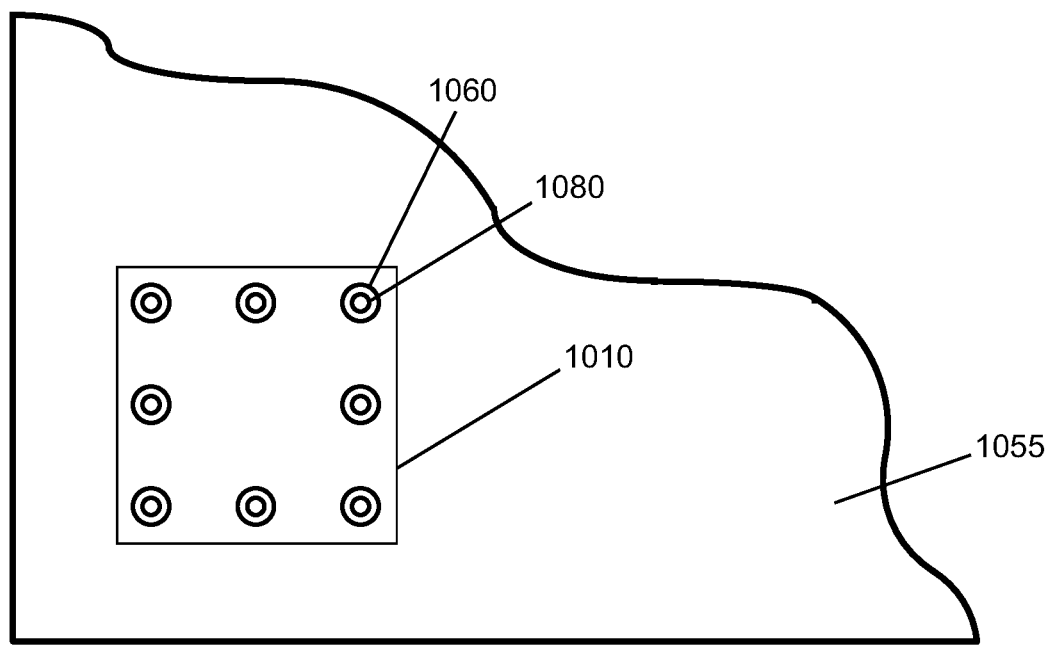
FIG. 4 is a fragmentary bottom view of an exemplary table top, showing the pattern of eight holes receiving the threaded metal inserts for securing the steel plate to the table top.
Figure 5:
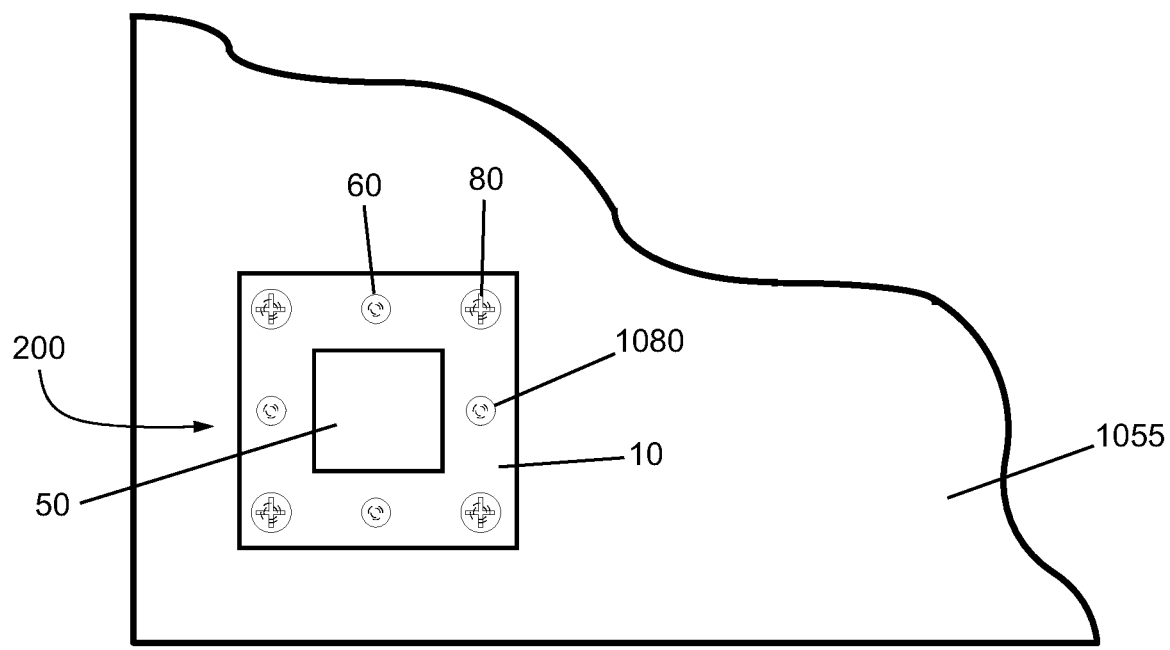
FIG. 5 is a fragmentary bottom view of the table top as shown in FIG. 4, having a metal plate/table leg assembly in accordance with this disclosure attached thereto.

Referring now to FIGS. 3-5, and with continued reference to FIGS. 1 and 2, FIG. 3 illustrates a side view of a table assembly 1000 employing the plate-surface attachment system 200 illustrated in FIG. 5 to connect the leg-plate subassembly 100 to a table top 1050. The plate-surface attachment system 200 allows for repeated attachment, removal, and reattachment the leg-plate subassembly 100 from the surface 1055. As illustrated in FIG. 4, the bottom surface 1055 of the tabletop 1050 or other substantially planar surface to which the metal plate 10 may be attached, is configured with one or more bores 1060. In certain embodiments, each bore 1060 is configured to receive a steel threaded insert 1080 for receiving corresponding mechanical fasteners 80. In certain embodiments, the mechanical fasteners 80 are machine bolts or screws. In certain embodiments the table top 1050 is further configured with machine cut rabbets or other recess or cavity 1010 in the furniture surface having a depth sufficient to accommodate at least a portion of the thickness of the metal plate 10. Each recess 1010 is configured to receive a leg-plate subassembly 100 and, in certain preferred embodiments, each recess 1010 has a depth sufficient to allow the metal plate 10 to be substantially flush with the bottom surface 1055 of the table top 1050, although it is contemplated that in certain embodiments, the metal plate 10 may be slightly or partially recessed within the cavity 1010 or protrude slightly beyond the bottom surface 1055 of the table top. In certain embodiments, each cavity 1010 is one-eighth of an inch deep. The cavities 1010 are cut in predetermined locations in the surface 1055 for positioning the plate and leg attachments 100 to provide desired support of the planar surface 1050. In certain embodiments, the cavity 1010 may be omitted.

FIG. 5 illustrates a leg 50 (or alternately a support post when inverted as described below) having a leg-plate subassembly 100 (or alternately a railing support assembly when inverted as described below) attached to the bottom surface 1055 of a table top 1050 by the plate-surface system 200 at a plurality of attachment points. In certain embodiments, a number of additional attachment points may be provided in excess of the number of attachments points necessary to securely attach the leg-plate subassembly to the table top 1050. For example, as shown in the illustrated embodiment, eight attachment points are provided, although only four threaded fasteners (i.e., machine bolts 80 received into the threaded inserts 1080) are actually used, with four fasteners being sufficient for stable attachment of the leg-plate subassembly 100 to the surface 1055. In the depicted exemplary embodiment, the attachment system 200 is configured with four additional apertures 60 corresponding to four additional bores 1060 with corresponding threaded inserts 1080, whereby the four additional threaded inserts 1080 provide redundancy to provide additional attachment points in the event that one or more threaded inserts 1080 or bolts 80 are damaged, or, in the event additional support is needed or desired. In certain embodiments, each hole 1060 is 5/16 inch wide and 7/8 inch deep, configured to receive threaded inserts 1080 that are 3/4 inch long to receive 1/4 inch-20 thread per inch bolts 80. It will be recognized that other numbers of attachments points and redundant attachment points, and other hardware dimensions are also contemplated.

In alternative embodiments, the bottom surface 1055 of the tabletop 1050 or other substantially planar furniture surface to which a leg 50 is to be attached includes one or more bores having at least two different widths; a wider width portion relative to a narrower width portion. In certain embodiments, the planar surface cavities or bores are formed with a stepped construction (e.g., such as a bore portion and a counterbore portion). Each bore configured to receive an epoxy resin, where the wider bore portion is configured to allow the epoxy to complete surround the thread of a screw when the screw is inserted into the bore, and form a bond to the walls of the bore. The narrower bore portion is configured to receive the tip of the screw and is sufficiently narrow to allow the screw to be torqued into the tabletop, drawing the plate towards the bottom surface of the tabletop and retaining the plate to the bottom surface.

In certain embodiments, the metal plate 10 is generally square and the apertures 15 for receiving the leg-retention screws 40 are spaced equidistantly in the center of the metal plate 10 with the apertures for receiving the screws for attachment to the furniture surface spaced equidistantly around the sides of the metal plate 10.

It will be recognized that the leg plate joinery assembly herein may be inverted and used to provide a high strength rail support assembly, wherein the furniture leg is replaced with an elongated rail post member and the furniture support member such as table top or chair seat is replaced with a floor, deck, porch, patio, or stair tread to which the rail post is to be attached.

Although the present development is shown by way of reference to a generally planar plate for attachment to a generally planar furniture surface and a leg having a generally planar surface, it is contemplated that the leg-plate subassembly may have a generally concave or convex surface. For example, the metal plate having a generally convex surface configured for attachment to a top portion of a leg having a generally concave surface.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A leg-plate joinery assembly comprising:
    a metal plate portion having a first set of one or more apertures and a second set of one or more apertures;
    a leg portion having one or more bore holes aligned with the first set of one or more apertures, each bore hole including a narrower width portion relative to a wider width portion;
    a first set of one or more mechanical fasteners, each mechanical fastener in the first set of one or more mechanical fasteners configured to pass through a corresponding aperture of the first set of one or more apertures such that each mechanical fastener is received in a corresponding, aligned one of the one or more bore holes;
    a second set of one or more mechanical fasteners, each mechanical fastener in the second set of one or more mechanical fasteners configured to pass through a corresponding aperture of the second set of one or more apertures; and an epoxy composition, the epoxy composition configured to be received in each of the one or more bore holes.

2. The leg-plate joinery assembly of claim 1, wherein each wider width portion has a width configured to allow the epoxy composition to completely surround at least a portion of the corresponding mechanical fastener of the first set of one or more mechanical fasteners.

3. The leg-plate joinery assembly of claim 1, wherein each mechanical fastener of the first set of one or more mechanical fasteners comprises a distal end, wherein the distal end is mechanically secured within the corresponding narrow portion of the one or more bore holes.

4. The leg-plate joinery assembly of claim 1, wherein the metal plate portion is formed of mild steel.

5. The leg-plate joinery system of claim 1, wherein the metal plate portion is removably attachable to a substantially planar surface having one or more cavities, wherein each of the one or more cavities is aligned with a corresponding aperture of the second set of one or more apertures.

6. The leg-plate joinery system of claim 5, wherein each cavity is configured to receive an internally threaded insert, wherein each threaded insert is configured to receive a corresponding mechanical fastener of the second set of one or more mechanical fasteners.

7. The leg-plate joinery system of claim 1, wherein the narrower width portion is a bore portion and the wider width portion is a counterbore portion.

8. An article of furniture, comprising:
a support member; and
a leg-plate joinery assembly, comprising:
   a metal plate portion having a first set of one or more apertures and a second set of one or more apertures;
   a leg portion having one or more bore holes aligned with the first set of one or more apertures, each bore hole including a narrow portion and a wide portion;
   a first set of one or more mechanical fasteners, each mechanical fastener in the first set of one or more mechanical fasteners configured to pass through a corresponding aperture of the first set of one or more apertures such that it is received in a corresponding, aligned one of the one or more bore holes;
   a second set of one or more mechanical fasteners, each mechanical fastener in the second set of one or more mechanical fasteners configured to pass through a corresponding aperture of the second set of one or more apertures; and
   an epoxy composition, the epoxy composition configured to be received in each of the one or more bore holes.

9. The article of furniture of claim 8, wherein the support member is selected from the group consisting of a table top and a chair seat.

10. A railing support assembly, comprising:
a metal plate portion having a first set of one or more apertures and a second set of one or more apertures;
a support post comprising an elongated member having one or more bore holes aligned with the first set of one or more apertures, each bore hole including a narrow portion and a wide portion;
a first set of one or more mechanical fasteners, each mechanical fastener in the first set of one or more mechanical fasteners configured to pass through a corresponding aperture of the first set of one or more apertures such that each mechanical fastener is received in a corresponding, aligned one of the one or more bore holes;
a second set of one or more mechanical fasteners, each mechanical fastener in the second set of one or more mechanical fasteners configured to pass through a corresponding aperture of the second set of one or more apertures; and
an epoxy composition, the epoxy composition configured to be received in each of the one or more bore holes.

11. The railing support assembly of claim 10, wherein the metal plate portion is removably attachable to a substantially planar surface having one or more cavities, wherein each of the one or more cavities is aligned with a corresponding aperture of the second set of one or more apertures.

12. The railing support assembly of claim 11, wherein each cavity is configured to receive an internally threaded insert, wherein each internally threaded insert is configured to receive a corresponding mechanical fastener of the second set of one or more mechanical fasteners.

* * * * *